(12) United States Patent
Nakajima et al.

(10) Patent No.: US 9,869,987 B2
(45) Date of Patent: Jan. 16, 2018

(54) FIELD BUS SYSTEM WITH INDUSTRIAL MEASUREMENT DEVICE HAVING AUTOMONOUS CONTROL OPERATION

(71) Applicant: YOKOGAWA ELECTRIC CORPORATION, Tokyo (JP)

(72) Inventors: Hiroaki Nakajima, Tokyo (JP); Kuniharu Akabane, Tokyo (JP); Shunsuke Hayashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 269 days.

(21) Appl. No.: 14/665,017

(22) Filed: Mar. 23, 2015

(65) Prior Publication Data

US 2015/0277411 A1 Oct. 1, 2015

(30) Foreign Application Priority Data

Mar. 25, 2014 (JP) .................................. 2014-061786

(51) Int. Cl.
| | | |
|---|---|---|
| G06F 13/00 | (2006.01) | |
| G05B 19/042 | (2006.01) | |
| G06F 13/42 | (2006.01) | |
| G05B 19/418 | (2006.01) | |

(52) U.S. Cl.
CPC ...... *G05B 19/0423* (2013.01); *G05B 19/4184* (2013.01); *G05B 2219/33323* (2013.01); *G06F 13/4282* (2013.01)

(58) Field of Classification Search
CPC ............ G05B 19/4184; G05B 19/0423; G05B 2219/33323; G06F 13/4282
See application file for complete search history.

(56) References Cited

U.S. PATENT DOCUMENTS

| | | | |
|---|---|---|---|
| 5,146,401 A | 9/1992 | Bansal et al. | |
| 5,522,043 A | 5/1996 | Fukunaga | |
| 6,499,114 B1* | 12/2002 | Almstead ........... | G05B 19/4184 399/26 |
| 7,817,063 B2* | 10/2010 | Hawkins .............. | G06Q 20/127 340/870.07 |
| 2008/0052560 A1 | 2/2008 | Murai | |
| 2010/0199003 A1* | 8/2010 | Kitamura ........... | G05B 19/0421 710/61 |
| 2015/0120001 A1* | 4/2015 | German ............. | G05B 19/4185 700/19 |

FOREIGN PATENT DOCUMENTS

| | | |
|---|---|---|
| CN | 1061671 A | 6/1992 |
| EP | 2221685 A2 | 8/2010 |
| GB | 2491033 A | 11/2012 |
| JP | 7-135510 A | 5/1995 |

(Continued)

*Primary Examiner* — Tammara Peyton
(74) *Attorney, Agent, or Firm* — Sughrue Mion, PLLC (57) ABSTRACT

A process control system includes an I/O module configured to be connected to a field device which is installed in a plant in which an industrial process is controlled, the I/O module autonomously transmitting data received from the field device, and a higher-level device that comprises a memory which temporarily stores the data autonomously transmitted from the I/O module, the higher-level device reading the data stored in the memory at a predetermined period.

16 Claims, 7 Drawing Sheets

(56) References Cited

FOREIGN PATENT DOCUMENTS

| | | |
|---|---|---|
| JP | 8-179816 A | 7/1996 |
| JP | 8320726 A | 12/1996 |
| JP | 2001-514406 A | 9/2001 |
| JP | 2007-286705 A | 11/2007 |
| JP | 2008052315 A | 3/2008 |
| JP | 4860620 B2 | 1/2012 |
| WO | 99/10787 A1 | 3/1999 |
| WO | 2006/028656 A2 | 3/2006 |

* cited by examiner

| | LOGICAL NAME | SENSOR DEVICE 11a | VALVE DEVICE 12a | SENSOR DEVICE 11b | VALVE DEVICE 12b | ... |
|---|---|---|---|---|---|---|
| ADDRESS | PHYSICAL ADDRESS | 100010 | 100020 | 200010 | 200020 | ... |
| | ... | ... | ... | ... | ... | ... |
| PERIODIC DATA | MEASUREMENT/CONTROL DATA | 12.3 | 78.9 | 45.6 | −10.5 | ... |
| | ... | ... | ... | ... | ... | ... |
| DEVICE MANAGEMENT DATA | DEVICE STATUS 1 | OK | NG | OK | OK | ... |
| | DEVICE STATUS 2 | ... | ... | ... | ... | ... |
| | DEVICE PHYSICAL POSITION | X5Y6 | X9Y7 | X8Y9 | X6Y2 | ... |
| | DEVICE Rev | 1.01 | 1.05 | 1.02 | 1.11 | ... |
| | ... | ... | ... | ... | ... | ... |
| OTHER | TIME STAMP | 12:05 | 12:06 | 12:05 | 12:07 | ... |
| | ... | ... | ... | ... | ... | ... |

FIELD BUS SYSTEM WITH INDUSTRIAL MEASUREMENT DEVICE HAVING AUTOMONOUS CONTROL OPERATION

BACKGROUND OF THE INVENTION

Field of the Invention

The disclosure relates to a process control system and a process control method.

Priority is claimed on Japanese Patent Application No. 2014-061786, filed Mar. 25, 2014, the contents of which are incorporated herein by reference.

Description of Related Art

A process control system is installed in a plant and a factory (hereinafter called simply "plant" as a generic name of them). The process control system controls various types of state quantity (for example, pressure, temperature, flow quantity, and so on). By the process control system, an advanced automatic operation is implemented.

In the process control system, field devices (for example, a measurement device, an operation device, or other devices) are connected to a controller via an I/O module. The controller controls the operation device (for example, an actuator) in accordance with a measurement result of the measurement device (for example, a sensor) so as to control the various types of the state quantity described above.

The field devices are used in the process control system. There are various types of the field devices in accordance with a measurement target and an operation target, and there are various types of input/output signals. For example, there are an analog signal of "4 to 20 [mA]", a digital signal of "24 [V]", a contact signal, a thermocouple signal, and so on. For the reason, the field device is connected to the controller via the I/O module which converts a signal, which is received from the field device, to a signal which can be processed by the controller.

Examples of a process control system installed in a plant are disclosed in Japanese Unexamined Patent Application Publication No. 2007-286705, Japanese Unexamined Patent Application Publication No. H8-179816, Japanese Unexamined Patent Application Publication No. H7-135510, Japanese Unexamined Patent Application Publication No. 2001-514406, and Japanese Patent No. 4860620. For example, in Japanese Unexamined Patent Application Publication No. 2007-286705, a process control system which suppresses a virtual memory mistake so as to improve a performance of a controller included in the process control system is disclosed. The virtual memory mistake is called as page fault, and the virtual memory mistake occurs in a case of using the virtual memory.

Communications performed by the process control system include a control data communication and a device data communication. The control data communication is a communication of transmitting and receiving data for a process control, and the device data communication is a communication of transmitting and receiving data which indicates a normality of the field device.

The control data communication is a periodic communication performed between the controller and the field device. In the control data communication, because there is a need to control a process data in real time, a priority of the control data communication is set to be higher than that of the device data communication. On the other hand, the device data communication is performed between a device manager and the field device via the controller. The device manager is a device for receiving a normality of the process control system. In contrast to the control data communication, because there is no need for the device data communication to communicate in real time, the priority of the device data communication is set to be lower than that of the control data communication so as not to affect the control data communication.

Both the control data communication and the device data communication are implemented by communicating between the controller and the I/O module by a command response method. Specifically, in the control data communication, the controller transmits a command for requesting data (for example, measurement data of a sensor) to the I/O module, and the I/O module transmits the data requested by the command to the controller. Similarly, in the device data communication, the controller transmits a command for requesting data (for example, data indicating the normality of the field device) to the I/O module, and the I/O module transmits the data requested by the command to the controller.

Recent field devices become intelligent, for example, most of the recent field devices have a self-diagnosis function for diagnosing states of a self-device. So as to collect various types of data transmitted from the field devices having the function in real time, there is a need to shorten a cycle of the communication of the command response method so as not to affect the control data communication. For the reason, there is a problem that a communication load and a load of the controller are increased. So as to resolve the problem, in a case of using a high-speed communication network and a high-performance controller and I/O module of which processing ability is high, costs are greatly increased.

The field devices having the self-diagnosis function include a field device which can autonomously notify a higher-level device of data which indicates a self-diagnosis result, and an abnormality and a variation which are generated in the self-device. Because the field device autonomously transmits the data to the controller via the I/O module, the communication of the command response method can be omitted and the load of the controller can be reduced.

Because the conventional I/O module has only a slave function of a master-slave communication, there is a need for the I/O module to also have the function of autonomously transmitting data so as to efficiently notify the controller of the data which is autonomously transmitted from the field device. However, because the autonomous notification is a non-periodic interrupt processing for the controller, there is a possibility of increasing the load of the controller and affecting the control data communication.

Further, in the process control system, there is a case that a plurality of controllers needs data from a particular I/O module. For example, there is a case that measurement data, which is output from the particular I/O module and used by a controller which controls an upstream process, is to be also used by another controller which controls a downstream process. In this case, there is a need to transmit the data from the particular I/O module to the plurality of controllers. However, the real-time processing cannot be performed (the process control is delayed and not performed in real time), and the load of the communication between the controller and the I/O module is increased.

SUMMARY

A process control system may include an I/O module configured to be connected to a field device which is installed in a plant in which an industrial process is controlled, the I/O module autonomously transmitting data received from the field device, and a higher-level device that comprises a memory which temporarily stores the data autonomously transmitted from the I/O module, the higher-level device reading the data stored in the memory at a predetermined period.

Further features and aspects of the present disclosure will become apparent from the following detailed description of exemplary embodiments with reference to the attached drawings.

DETAILED DESCRIPTION OF THE EMBODIMENTS

An aspect of some embodiments of the present invention is to provide a process control system and a process control method which can obtain various types of information from the field device without a heavy processing load and a cost increase.

Another aspect of some embodiments of the present invention is to provide a process control system and a process control method which can transmit the various types of information from the field device to a plurality of the controllers in real time.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

First Embodiment

Figure 1:
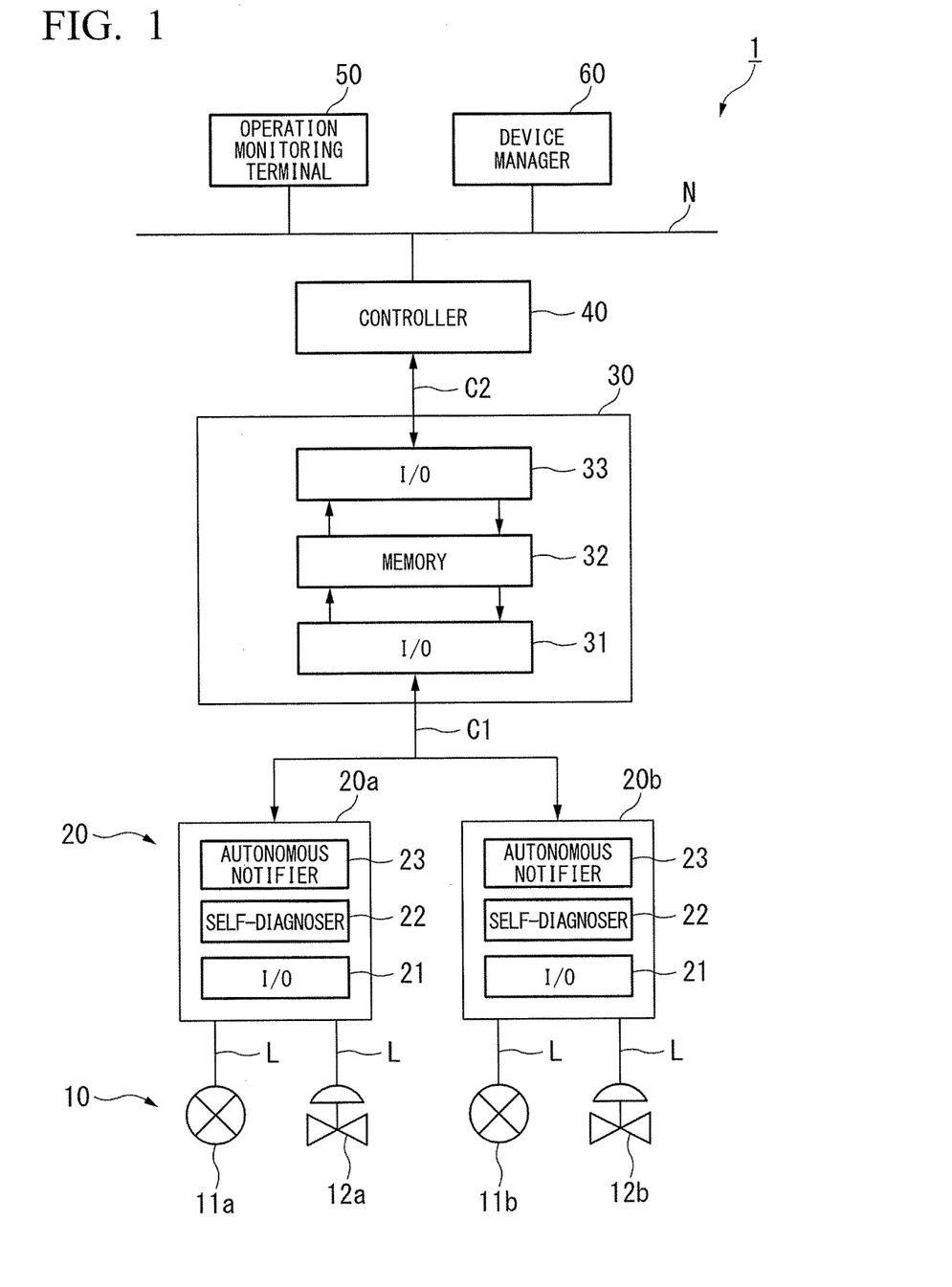
FIG. 1 is a block diagram of a process control system in the first embodiment.

FIG. 1 is a block diagram of a process control system in the first embodiment. As shown in FIG. 1, the process control system 1 of the first embodiment is equipped with a field device 10, an I/O module 20, a signal relay 30, a controller 40, an operation monitoring terminal 50, and a device manager 60. The controller 40 controls the field device 10 in accordance with an instruction transmitted from the operation monitoring device 50 so as to control an industrial process implemented in a plant (not shown). In the process control system 1 of the first embodiment, a normality of the field device 10 can be obtained by the device manager 60.

The field device 10 and the I/O module are connected via a transmission line L (for example, a transmission line transmitting a signal of "4 to 20 [mA]"). The I/O module 20 and the signal relay 30 are connected via a cable C1. The signal relay 30 and the controller 40 are connected via a cable C2. The controller 40, the operation monitoring terminal 50, and the device manager 60 are connected to a control network N. For example, the control network N is a network which connects between a field site in the plant and a monitoring room.

The field device 10 is such as a sensor device (for example, a flowmeter and a temperature sensor), a valve device (for example, a flow control valve and an on-off valve), an actuator device (for example, a fan and a motor), and other devices installed in the plant. In the present embodiment, to understand easily, it will be described as an example that the state quantity which is controlled in the industrial process is a flow quantity of fluid. Therefore, as the field device 10 installed in the plant, two sensor devices 11a and 11b which measure the flow quantity of fluid and two valve devices 12a and 12b which control (operate) the flow quantity of fluid are illustrated in FIG. 1.

The field device 10 has the self-diagnosis function for diagnosing a state of the self-device. The field device 10 autonomously transmits information (status) representing diagnosis result by the self-diagnosis function and abnormal information (alarm) generated in the field device 10 to a higher-level device (the I/O module 20). The field device 10 can perform a hybrid communication such as a HART (registered trademark). In the hybrid communication, a digital signal is superimposed on an analog signal so as to transmit the digital signal and the analog signal simultaneously. For example, the sensor devices 11a and 11b transmit a process value (the flow quantity of fluid) as the analog signal, and the sensor devices 11a and 11b transmit the status and the alarm as the digital signal.

The I/O module 20 is disposed between the field device 10 and the signal relay 30, and a plurality of the field devices 10 can be connected to the I/O module 20. The I/O module 20 processes signals which are input or output between the field device 10 and the signal relay 30. For example, the I/O module 20 receives the signal (the analog signal of "4 to 20 [mA]" and a digital signal superimposed on the analog signal) from the field device 10, and the I/O module 20 converts the received signal to a signal which can be received by the controller 40. Thereafter, the I/O module outputs the converted signal to the signal relay 30.

The I/O module 20 is equipped with an I/O 21 (obtainer), a self-diagnoser 22, and an autonomous notifier 23. The I/O module 20 can autonomously transmits the data received from the field device 10 and data obtained in the I/O module 20 to the higher-level device (the signal relay 30). The I/O 21 receives the data (the process value, the status, and the alarm) autonomously transmitted from the field device 10, and the I/O 21 outputs data, which is to be transmitted to the field device 10, to the transmission line L.

The self-diagnoser 22 has a self-diagnosis function same as the field device 10, and the self-diagnoser 22 diagnoses the state of the I/O module 20. The autonomous notifier 23 autonomously transmits the data, which is transmitted from the field device 10 and received by the I/O 21, to the signal relay 30. Also, the autonomous notifier 23 autonomously transmits the data, which is obtained in the I/O module 20, to the signal relay 30. For example, the data obtained in the I/O module 20 is information such as the status and the alarm obtained by the self-diagnoser 22. At the timing when the I/O 21 receives the data from the field device 10 or when the self-diagnoser 22 obtains the status or the alarm, the autonomous notifier 23 autonomously transmits the data to the signal relay 30.

A plurality of I/O modules 20 having the configuration described above is disposed in accordance with a number of the field devices 10 installed in the plant. In FIG. 1, to avoid complication of the drawing, only two I/O modules 20a and 20b of the plurality of I/O modules 20 installed in the plant are illustrated. As shown in FIG. 1, the I/O module 20a is connected to the sensor device 11a and the valve device 12a, and the I/O module 20b is connected to the sensor device 11b and the valve device 12b.

The signal relay 30 is disposed between the I/O module 20 and the controller 40. The signal relay 30 relays the data transmitted between the I/O module 20 and the controller 40. Specifically, the signal relay 30 is equipped with an I/O 31, a memory 32, and an I/O 33. The signal relay 30 temporarily stores the data autonomously transmitted from the I/O module 20, and the signal relay 30 transmits the stored data to the controller 40 in accordance with a request from the controller 40. The signal relay 30 receives data from the controller 40, and the signal relay 30 transmits the received data to the I/O module 20.

The I/O 31 is connected to the I/O module 20 (the I/O modules 20a and 20b) via the cable C1. The I/O 31 receives the data autonomously transmitted from the I/O module 20, and the I/O 31 outputs the received data to the memory 32. The I/O 31 outputs data, which is to be transmitted to the I/O module 20, to the cable C1. The I/O 33 is connected to the controller 40 via the cable C2. The I/O 33 receives the data transmitted from the controller 40, and the I/O 33 outputs the received data to the memory 32. The I/O 33 outputs data, which is to be transmitted to the controller 40, to the cable C2.

For example, the memory 32 is equipped with a volatile memory or a non-volatile memory. The memory 32 temporarily stores the data received by the I/O 31 (the data autonomously transmitted from the I/O module 20) and the data received by the I/O 33 (the data transmitted from the controller 40). Of the data temporarily stored in the memory 32, the former data (the data received by the I/O 31) is input to the signal relay 30, and the former data is read out of the memory 32 at a predetermined timing in accordance with a request (command) transmitted from the controller 40. On the other hand, so as to immediately reflect the calculation result of the controller 40 to the field device 10, the latter data (the data received by the I/O 33) is transmitted to the I/O module 20 immediately after the I/O 33 receives the latter data.

Figure 2:
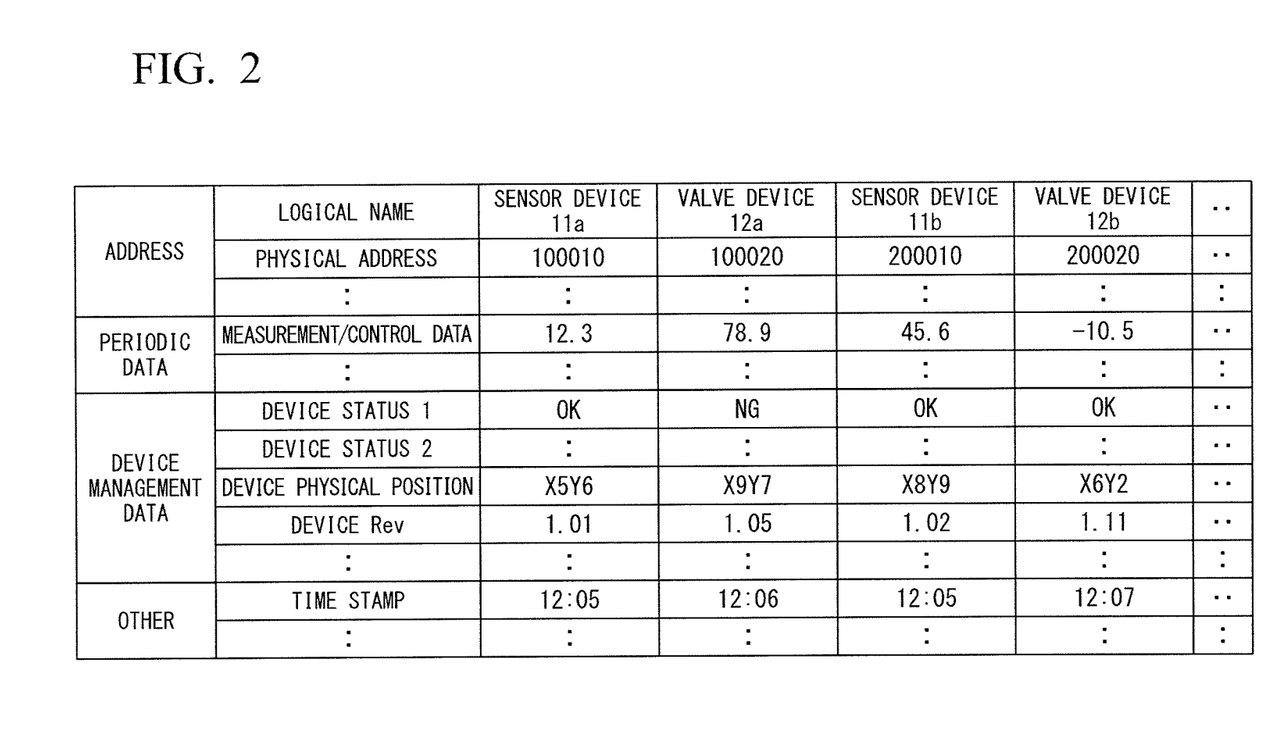
FIG. 2 is a drawing illustrating a memory map of the memory in the first embodiment.

FIG. 2 is a drawing illustrating a memory map of the memory in the first embodiment. As shown in FIG. 2, the memory 32 included in the signal relay 30 has memory areas for each field device. For example, a memory area of which physical address is "100010" is allocated to the sensor device 11a, and a memory area of which physical address is "200010" is allocated to the sensor device 11b. In the each memory area, data (the periodic data in FIG. 2) which is transmitted by the control data communication and data (the device management data in FIG. 2) which is transmitted by the device data communication are stored. A time stamp, which indicates a time when the data is stored, is attached to the data stored in the memory area.

The controller 40 performs the process control communication with the field device 10 in accordance with an instruction or the like transmitted from the operation monitoring terminal 50 so as to control the field device 10. Specifically, the controller 40 receives a process value measured by a first field device (for example, the sensor device 11). The controller 40 calculates a manipulation volume of a second field device (for example, the valve device 12a) and transmits the manipulation volume to the second field device so as to control the second field device.

The controller 40 reads the data which is stored in the memory 32 of the signal relay 30 at a predetermined scan period (for example, 1 second period) so as to control the field device 10. The controller 40 reads the data stored in the memory 32 of the signal relay 30 by the command response method. Specifically, the controller 40 transmits a command for requesting data to the signal relay 30, and the signal relay 30 reads the data which is requested by the command from the memory 32 and transmits the data to the controller 40, so that the controller 40 can read the data stored in the memory 32 of the signal relay 30.

For example, the operation monitoring terminal 50 is operated by a plant operator, and the operation monitoring terminal 50 is used to monitor the processes performed in the plant. Specifically, the operation monitoring terminal 50 receives input/output data of the field device 10 from the controller 40. The operation monitoring terminal 50 notifies the plant operator of the states of the field device 10 and the controller 40 which are included in the process control system 1. The operation monitoring terminal 50 controls the controller 40 in accordance with the instruction which is input by the plant operator.

The device manager 60 receives the status and the alarm of the various types of devices (for example, the field device 10, the I/O module 20, the controller 40, and so on) included in the process control system 1 so as to determine the normality of these devices. If necessary, the device manager 60 notifies the plant operator or maintenance personnel of information representing the normality. In a case where the device manager 60 receives the status and the alarm from the field device 10 and the I/O module 20, the device manager 60 receives the status and the alarm stored in the memory 32 of the signal relay 30 via the controller 40. Such configuration makes it possible for the device manager 60 to receive the status and the alarm from the field device 10 and the I/O module 20 without increasing the load of the controller 40.

Figure 3A:
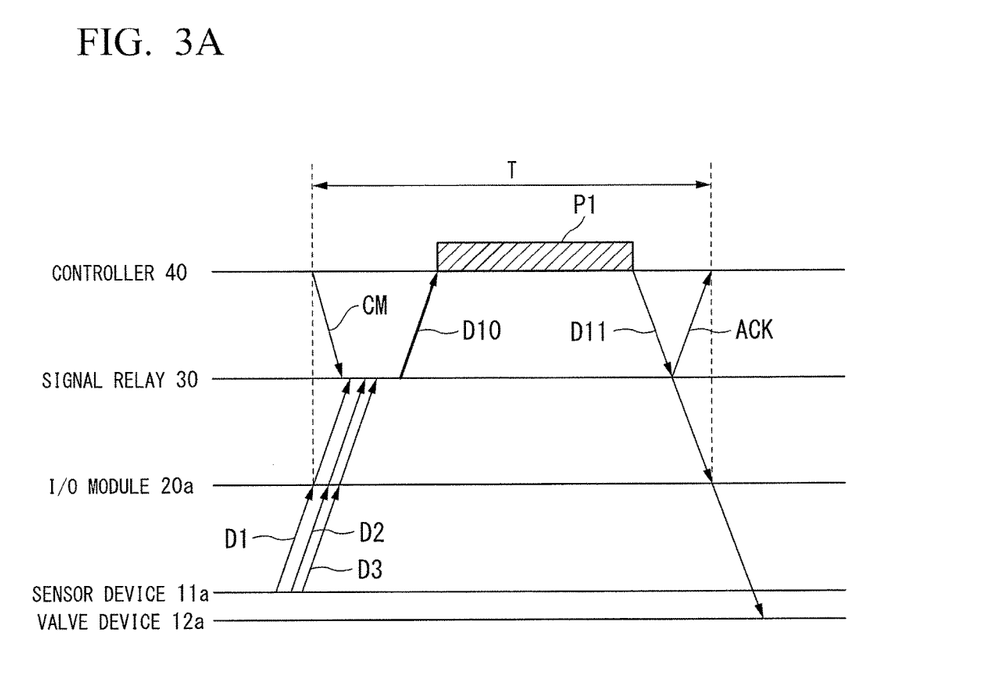
FIG. 3A is a timing chart illustrating the operations of the process control system 1 in the first embodiment.

Next, operations of the process control system 1 having the configuration described above will be described. FIG. 3A is a timing chart illustrating the operations of the process control system 1 in the first embodiment. So as to describe simply, an example of the controller 40, which controls the valve device 12a in accordance the data (data indicating the flow quantity of fluid) transmitted from the sensor device 11a, will be described.

As shown in FIG. 3A, the sensor device 11a transmits data D1 indicating the flow quantity of fluid to the I/O module 20a via the transmission line L. Thereafter, the sensor device 11a autonomously transmits data D2 indicating the self-diagnosis result and data D3 indicating the alarm of the sensor device 11a to the I/O module 20a via the transmission line L. The I/O 21 of the I/O module 20a receives the data D1 to D3 transmitted from the sensor device 11a.

The autonomous notifier 23 disposed in the I/O module 20a autonomously transmits the data D1 to D3 received by the I/O 21 to the signal relay 30 via the cable C1. Although illustration is omitted form FIG. 3A, in a case where the self-diagnoser 22 disposed in the I/O module 20a diagnoses the I/O module 20a, the autonomous notifier 23 autonomously transmits data indicating the self-diagnosis result of the self-diagnoser 22 to the signal relay 30 via the cable C1.

The data D1 to D3 transmitted from the I/O module 20a are input to the signal relay 30 via the cable C1. The I/O 31 of the signal relay 30 receives the data D1 to D3 sequentially. The memory 32 disposed in the signal relay 30 stores the data D1 to D3 received by the I/O 31. Specifically, these data D1 to D3 are stored in the memory area of which physical address is "100010" as shown in FIG. 2. The memory area is preliminarily prepared in the memory 32. Every time the I/O 31 receives new data, the data stored in the memory 32 can be updated.

In parallel with the operation described above, the controller 40 reads the data from the memory 32 of the signal relay 30 by the command response method at the predetermined scan period T (for example, 1 second period). Specifically, the controller 40 transmits a command CM for requesting data to the signal relay 30 at the scan period T, the signal relay 30 reads the data D1 to D3 from the memory 32 in accordance with the command CM, and the signal relay 30 transmits the data D1 to D3 to the controller 40 as the data D10 shown in FIG. 3A.

The controller 40 receives the data D10 (the data D1 to D3) from the signal relay 30. Thereafter, the controller 40 performs a process P1 of calculating a manipulation volume of the valve device 12a in accordance with the data D1 indicating the flow quantity of fluid and included in the data D10. On the other hand, the controller 40 transmits the data D2 and D3, which are included in the data D10 transmitted from the signal relay 30, to the device manager 60. The data D2 and D3 are used so as to determine the normality of the sensor device 11a and so on.

As shown in FIG. 3A, the controller 40 finishes the process P1 within the scan period T, and the controller 40 does not continue to perform the process P1 from the current scan period T to the next scan period. That is, a period from when the controller 40 receives the data from the signal relay 30 to when the controller 40 finishes the process P1 of calculating the manipulation volume of the valve 12a is within the scan period T.

When the controller 40 finishes the process P1, the controller 40 transmits data D11 indicating the calculated manipulation volume of the valve device 12a to the signal relay 30 via the cable C2. The I/O 33 of the signal relay 30 receives the data D11 from the controller 40. In response to receive the data D11, the I/O 33 transmits an acknowledge signal ACK to the controller 40. The memory 32 of the signal relay 30 temporarily stores the data D11 received by the I/O 33. Thereafter, the data D11 is output to the I/O 31.

The I/O 31 transmits the data D11 to the I/O module 20a via the cable C1. The I/O 21 receives the data D11 from the I/O 31, and the I/O 21 transmits the data D11 to the valve device 12a via transmission line L. Thereafter, the valve device 12a controls an opening amount of a valve in accordance with the data D11. By repeating the processes described above, the state quantity (for example, the flow quantity of fluid) in the industrial process can be controlled.

Figure 3B:
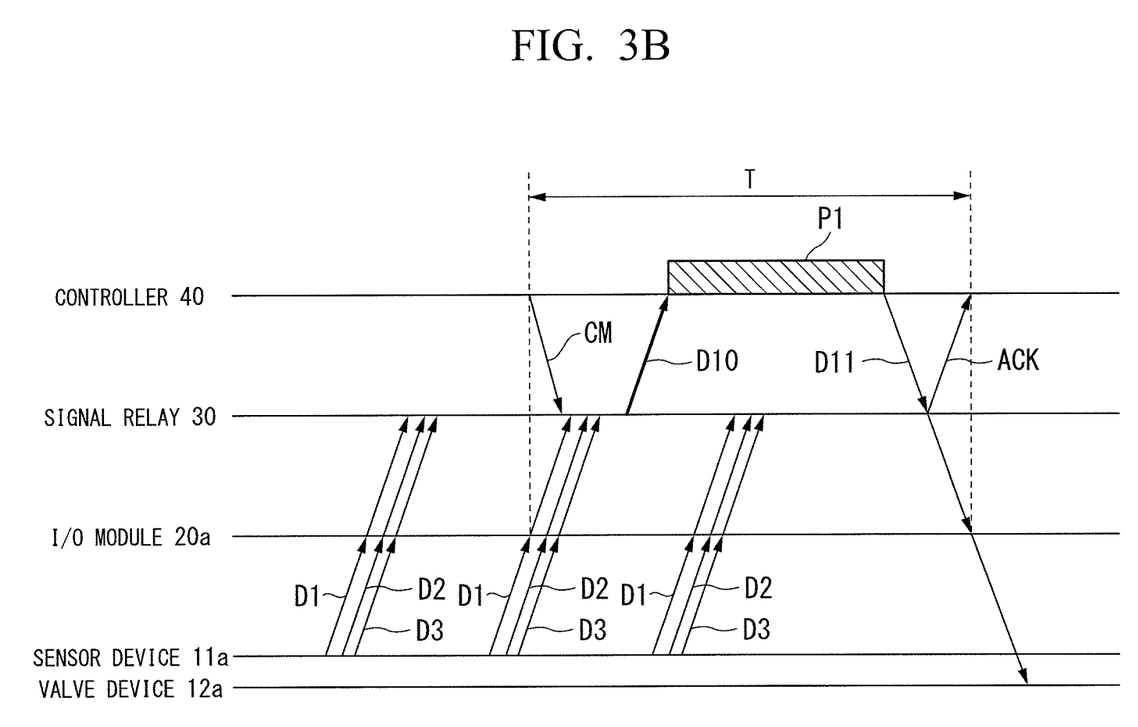
FIG. 3B is a timing chart illustrating the operations of the process control system 1 in the first embodiment.

FIG. 3B is a timing chart illustrating the operations of the process control system 1 in a case where the signal relay 30 receives the data D1 to D3 from the sensor device 11a more frequently. As shown in FIG. 3B, in a case where the signal relay 30 receives the command CM from the controller 40, the signal relay 30 transmits the data D1 to D3 to the controller 40. On the other hand, in a case where the signal relay 30 does not receive the command CM from the controller 40, the signal relay 30 does not transmit the data D1 to D3 to the controller even if the signal relay 30 newly receives the data D1 to D3. In a case where the signal relay 30 newly receives the data D1 to D3 without receiving the command CM, the signal relay 30 discards the data D1 to D3 stored in the memory 32, and the signal relay 30 stores the newly received data D1 to D3 in the memory 32. That is, the data D1 to D3 stored in the memory 32 is updated.

As described above, in the first embodiment, the process control system 1 is equipped with the signal relay 30 which is disposed between the I/O module 20 and the controller 40, the signal relay 30 temporarily stores the data autonomously transmitted from the I/O module 20 in the memory 32, and the controller 40 receives the data stored in the memory 32 by the command response method. Such configuration makes it possible for the signal relay 30 to receive the data, which is autonomously transmitted from the I/O module 20, at the conventional scan period T (for example, 1 second period). Therefore, in the first embodiment, the various types of information can be received from the field device 10 and the I/O module 20 in real time without a heavy processing load and a cost increase.

Second Embodiment

Figure 4:
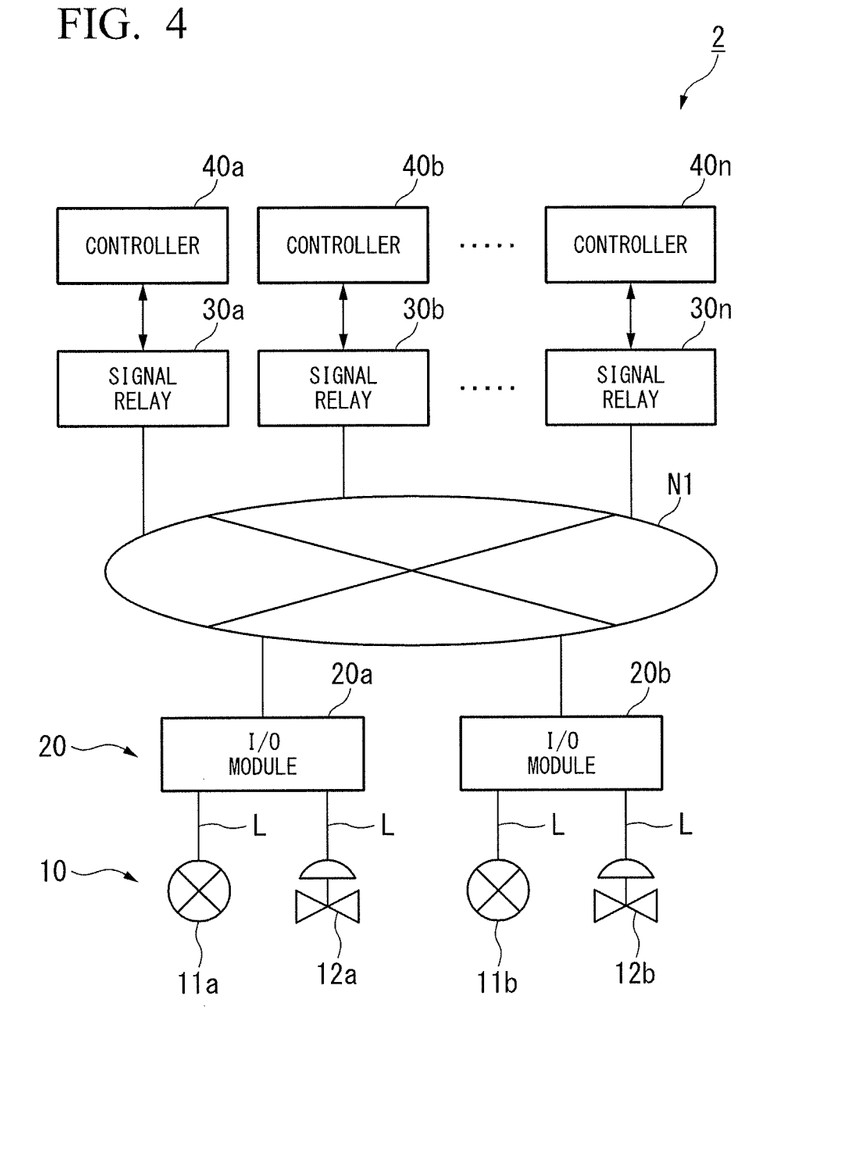
FIG. 4 is a block diagram of a process control system in the second embodiment.

FIG. 4 is a block diagram of a process control system in the second embodiment. In FIG. 4, parts that correspond to those in FIG. 1 are assigned the same reference numerals. The operation monitoring terminal 50, the device manager 60, and the control network N shown in FIG. 1 are omitted from FIG. 4.

As shown in FIG. 4, the process control system 2 of the second embodiment is equipped with not only the field device 10 and the I/O module 20, but also a plurality of signal relays 30a to 30n and a plurality of controllers 40a to 40n. The I/O module 20 (the I/O modules 20a and 20b) and the signal relays 30a to 30n are connected via a network N1. The process control system 2 can transmit data, which is received from a certain I/O module, to the plurality of the controllers 40a to 40n in real time.

The configurations of the signal relays 30a to 30n are same as that of the signal relay 30 shown in FIG. 1. The signal relays 30a to 30n are disposed with respect to the controllers 40a to 40n respectively. The signal relays 30a to 30n temporarily store the data which is autonomously transmitted from the I/O module 20 via the network N1. In response to a request from a controller, the signal relay corresponding to the controller transmits the stored data to the controller, and the signal relay transmits the data, which is transmitted from the controller, to the I/O module 20.

The configurations of the controller 40a to 40n are same as that of the controller 40 shown in FIG. 1. The controllers 40a to 40n read the data from the corresponding signal relays 30a to 30n at a predetermined scan period (for example, 1 second period) so as to control the field device 10. The network N1 which connects between the I/O module 20 and the signal relays 30a to 30n can be implemented by a network such as an Ethernet (registered trade mark) or the like.

Next, operations of the process control system 2 having the configuration described above will be described simply. So as to describe simply, same as FIG. 3A, the sensor device 11a transmits the data D1 indicating the flow quantity of fluid to the I/O module 20, and thereafter the sensor device 11a autonomously transmits the data D2 indicating the self-diagnosis result and the data D3 indicating the alarm to the I/O module 20 sequentially.

The I/O module 20a receives the data D1 to D3, which are transmitted from the sensor device 11a, via the transmission line L. The autonomous notifier 23 (not shown in FIG. 3A and FIG. 3B: referring to FIG. 1), which is disposed in the I/O module 20a, autonomously transmits the data D1 to D3 to the signal relays 30a to 30n connected to the network N1. For example, the autonomous notifier 23, which is disposed in the I/O module 20a, performs a broadcast with respect to the network N1 so as to transmit the data D1 to D3 to the signal relays 30a to 30n.

Each of the signal relays 30a to 30n receives the data D1 to D3, which is transmitted from the I/O module 20a, via the network N1 and temporarily stores the data D1 to D3. The controllers 40a to 40n read the data D1 to D3, which are temporarily stored in the signal relays 30a to 30n, by a command response method. In this way, data transmitted from a certain I/O module (for example, I/O module 20a) is transmitted to the controllers 40a to 40n. Because the data (for example, the data indicating the manipulation volume of the valve devices 12a and 12b) calculated by the controllers 40a to 40n is same as that of the first embodiment except for being transmitted to the valve devices 12a and 12b via the network N1, detail explanation will be omitted.

As described above, in the second embodiment, the process control system 2 is equipped with the signal relays 30a to 30n corresponding to the controllers 40a to 40n, the I/O module 20 (I/O modules 20a and 20b) and the signal relays 30a to 30n are connected to the network N1, and the I/O module 20 autonomously transmits the data, which is received from the field device 10, to the signal relays 30a to 30n which are connected to the network N1. For the reason, the controllers 40a to 40n can share the data received from the certain I/O module in real time, and a user can manipulate (engineer) the control data without considering a physical connection relation between the controllers 40a to 40n and the I/O module 20.

Third Embodiment

Figure 5:
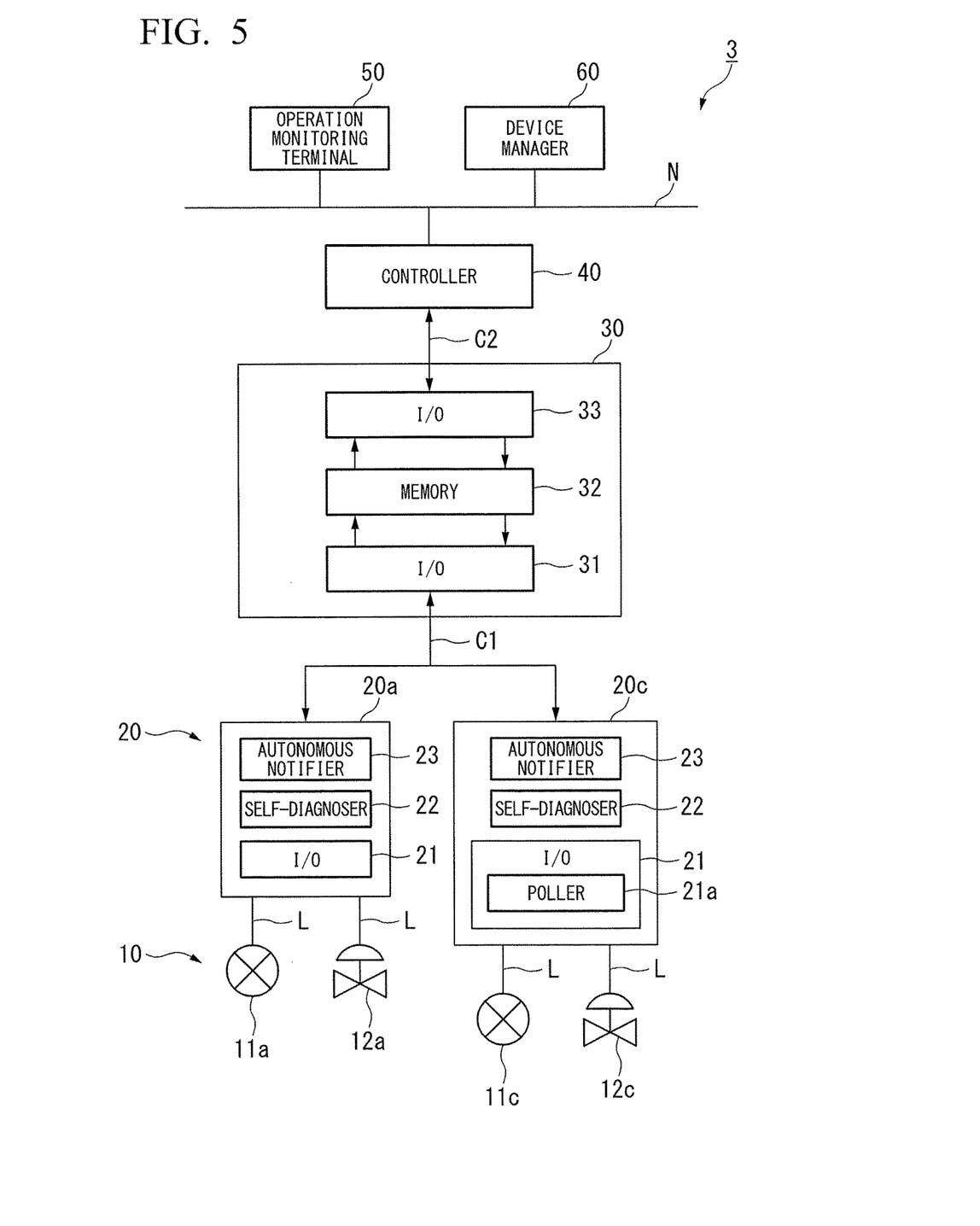
FIG. 5 is a block diagram of a process control system in the third embodiment.

FIG. 5 is a block diagram of a process control system in the third embodiment. In FIG. 5, same as FIG. 4, parts that correspond to those in FIG. 1 are assigned the same reference numerals. As shown in FIG. 5, the process control system 3 of the third embodiment is equipped with a sensor device 11c and a valve device 12c instead of the sensor device 11b and the valve device 12b which are included in the process control system 1 shown in FIG. 1, and the process control system 3 is equipped with an I/O module 20c instead of the I/O module 20b. The process control system 3 having such configuration can deal with the field device which does not have a function of autonomously transmitting data.

The sensor device 11c and the valve device 12c are same as the sensor device 11b and the valve device 12b shown in FIG. 1 except for not having the function of autonomously transmitting data. The I/O module 20c is almost same as the I/O module 20b shown in FIG. 1 except for being equipped with a poller 21a disposed in the I/O 21. For example, the poller 21a communicates with the sensor device 11c and the valve device 12c at a constant periodic interval, and the poller 21a receives the data from the sensor device 11c and the valve device 12c by the command response method. Specifically, the poller 21a transmits a command for requesting data to the sensor device 11c and the valve device 12c respectively, and the poller 21a receives data transmitted from the sensor device 11c and the valve device 12c respectively as a response with respect to the command.

The process control system 3, which has the configuration described above, performs operations which is basically same as that of the process control system 1 of the first embodiment except for the I/O module 20 which receives the data from the field device (the sensor device 11c and the valve device 12c) which does not have the function of autonomously transmitting data. For the reason, in the third embodiment, the various types of information can be received from the field device 10 and the I/O module 20 without a heavy processing load and a cost increase. The third embodiment can be adapted to the second embodiment.

In the third embodiment, there is no need for the device manager 60 to obtain normality of all the field devices 10. The I/O module 20 just has to autonomously transmit a notification only when an abnormality occurs in the field device 10, and the device manager 60 just has to receive the data stored in the memory 32 of the signal relay 30 only when the device manager 60 receives the notification from the I/O module 20. By this configuration, the load of the device manager 60, the network N, and an I/O communication network which is between the controller 40 and the I/O module 30 can be reduced, and a response of detecting the abnormality in the field device 10 can be improved as compared with a case of polling. If the load of the network N and the I/O communication network is reduced, because there is no need to upgrade the speed of the network N and the I/O communication network, the costs can be reduced.

In the third embodiment, regardless whether or not the field device 10 has the function of autonomously transmitting data, the device manager 60 recognizes the field device 10 as a device having the function. For the reason, there is no need for the device manager 60 to change a method of obtaining the normality in accordance with a type of the field device 10. By this configuration, for example, even if a field device which has the function of autonomously transmitting data is changed to another field device which does not have the function, and even if a field device which does not have the function is changed to another field device which has the function, there is no need for the device manager 60 to change the method of obtaining the normality.

Fourth Embodiment

Figure 6:
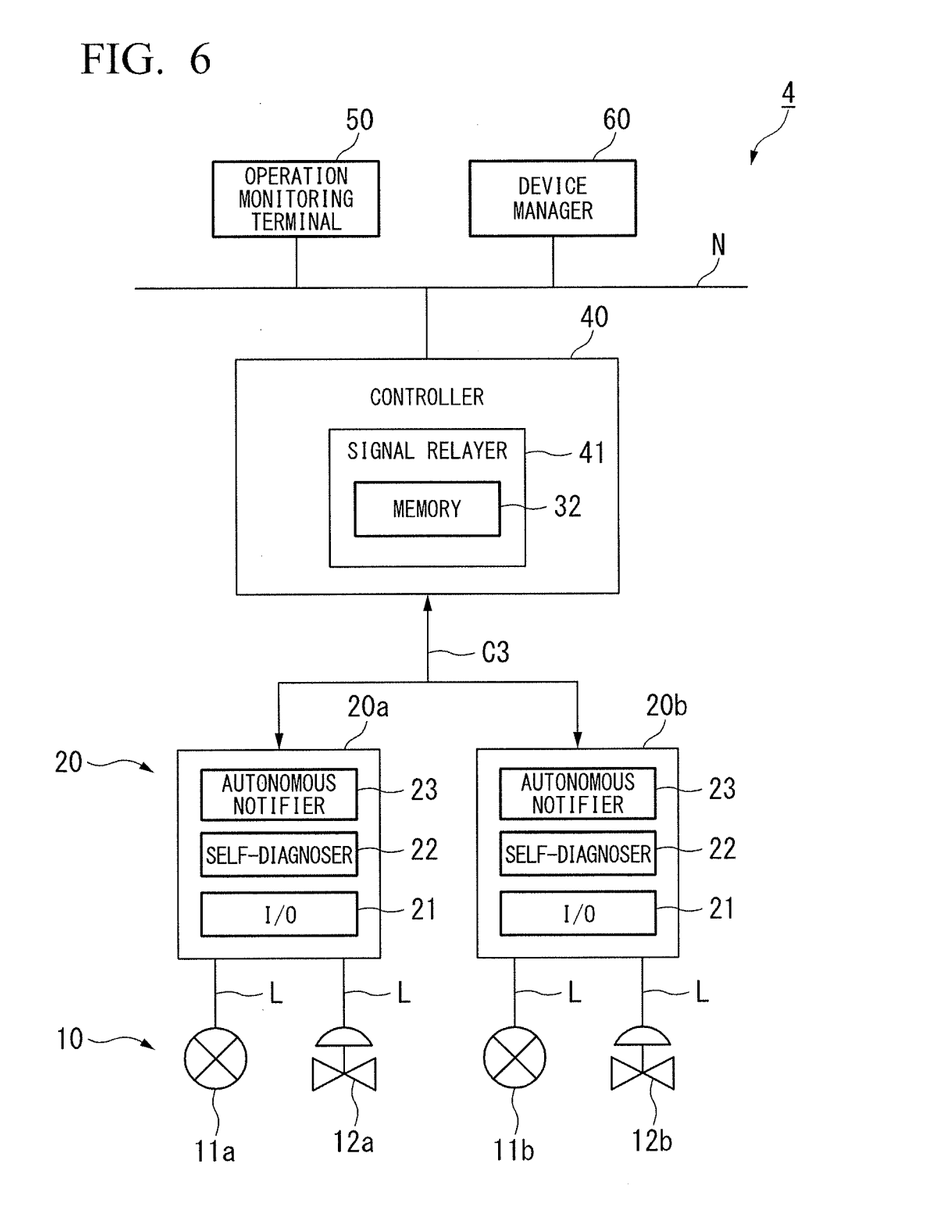
FIG. 6 is a block diagram of a process control system in the fourth embodiment.

FIG. 6 is a block diagram of a process control system in the fourth embodiment. In FIG. 6, same as FIG. 4 and FIG. 5, parts that correspond to those in FIG. 1 are assigned the same reference numerals. As shown in FIG. 6, the process control system 4 of the fourth embodiment is equipped with a controller 40 which includes the function of the signal relay 30 shown in FIG. 1.

Specifically, as shown in FIG. 6, the signal relay 30 is omitted from the process control system 4 of the fourth embodiment. The process control system 4 is equipped with a controller 40 which has a signal relay 41. The signal relay 41 has a same function as the signal relay 30. Because the signal relay 30 is omitted, the I/O module 20 (the I/O modules 20a and 20b) is connected to the controller 40 via a cable C3.

The process control system 4 of the fourth embodiment is basically same as the process control system 1 of the first embodiment except for the controller 40 which includes the function of the signal relay 30. For the reason, in the fourth embodiment, the various types of information can be received from the field device 10 and the I/O module 20 without a heavy processing load and a cost increase.

Although a process control system and a process control method according to embodiments of the present invention has been described above, the present invention is not restricted to the above-described embodiments, and can be freely modified within the scope thereof. For example, although the foregoing descriptions of the embodiments have been examples in which the signal relay 30 has only one memory 32, the signal relay 30 may have a plurality of memories 32. The signal relay 30 may be connected to the controller 40 one-on-one, the signal relay 30 may be connected to a plurality of the controllers 40, and a controller 40 may be connected to a plurality of the signal relays 30.

In a case where the sensor device 11a or the I/O module 20a is broken down, the signal relay 30 cannot receive the data D1 to D3. For the reason, when the signal relay 30 receives the command CM from the controller 40, in a case where the signal relay 30 determines that the signal relay 30 does not receive the data D1 to D3 for more than predetermined time, the signal relay 30 may transmit a signal indicating an abnormality of the sensor device 11a or the I/O module 20a to the controller 40 instead of transmitting the data D10. In accordance with the signal indicating the abnormality, the controller 40 may stop controlling the valve device 12a.

In a case where the signal relay 30 is broken down, the controller 40 cannot receive the data D10 from the signal relay 30 even if the controller transmits the command CM to the signal relay 30. For the reason, in a case where the controller 40 determines that the controller 40 does not receive the data D10 for more than predetermined time from when the controller transmits the command CM, the controller may determine that the signal relay 30 is broken down, and the controller 40 may stop controlling the valve device 12a.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A process control system comprising:
   an I/O module that is connected to a first field device which is installed in a plant in which an industrial process is controlled, the I/O module autonomously transmitting a process value and device management data received from the first field device, the process value being measured by the first field device;
   a signal relay that comprises a memory which temporarily stores the process value and the device management data autonomously transmitted from the I/O module;
   a controller configured to read the process value and the device management data stored in the memory of the signal relay at a predetermined period, the controller calculating a manipulation volume based on the process value, the controller transmitting the manipulation volume to the signal relay to control a second field device via the I/O module or another I/O module, the second field device being different from the first field device and connected to the I/O module or the another I/O module; and
   a device manager configured to obtain the device management data from the controller so as to determine a normality of the first field device.

2. The process control system according to claim 1, wherein
   the I/O module is configured to autonomously transmit not only the process value and the device management data received from the first field device but also autonomously transmit data which is obtained in the I/O module to the signal relay.

3. The process control system according to claim 1, wherein
   the I/O module comprises an obtainer which is configured to obtain, via a transmission line connecting the first field device and the I/O module, the process value and the device management data which are autonomously transmitted from the first field device, and
   the I/O module is configured to autonomously transmit the process value and the device management data obtained by the obtainer to the signal relay.

4. The process control system according to claim 3, wherein
   in a case where the first field device does not have a function of autonomously transmitting data, the obtainer obtains the data from the first field device by a command response method.

5. The process control system according to claim 1, wherein
   the I/O module and a plurality of signal relays are connected via a network, and
   the I/O module is configured to autonomously transmit the process value and the device management data, which are received from the first field device, to the plurality of the signal relays connected to the network.

6. The process control system according to claim 1, wherein
   the controller is configured to read the process value and the device management data stored in the memory of the signal relay by a command response method.

7. The process control system according to claim 1, wherein
   the I/O module comprises a poller which is configured to communicate with the first field device via a transmission line connecting the first field device and the I/O module at a constant periodic interval, the poller receiving the process value and the device management data from the first field device by a command response method.

8. A process control system comprising:
   an I/O module that is connected to a first field device which is installed in a plant in which an industrial process is controlled, the I/O module autonomously transmitting a process value and device management data received from the first field device, the process value being measured by the first field device;
   a controller that comprises a signal relay which comprises a memory, the memory temporarily storing the process value and the device management data autonomously transmitted from the I/O module, the controller reading the process value and the device management data stored in the memory of the signal relay at a predetermined period, the controller calculating a manipulation volume based on the process value to control a second field device via the I/O module or another I/O module, the second field device being different from the first field device and connected to the I/O module or the another I/O module; and a device manager configured to obtain the device management data from the controller so as to determine a normality of the first field device.

9. A process control method comprising:

receiving, by an I/O module, a process value and device management data from a first field device which is installed in a plant in which an industrial process is controlled, the process value being measured by the first field device, the I/O module being connected to the first field device;

autonomously transmitting, by an I/O module, the process value and the device management data received from the first field device;

temporarily storing, by a memory, the process value and the device management data autonomously transmitted from the I/O module;

reading, by a controller, the process value and the device management data stored in the memory at a predetermined period, the memory being disposed in a signal relay;

calculating, by the controller, a manipulation volume based on the process value;

transmitting, by the controller, the manipulation volume to the signal relay to control a second field device via the I/O module or another I/O module, the second field device being different from the first field device and connected to the I/O module or the another I/O module; and obtaining, by a device manager, the device management data from the controller so as to determine a normality of the first field device.

10. The process control method according to claim 9, further comprising:

autonomously transmitting, by the I/O module, not only the process value and the device management data received from the first field device but also autonomously transmit data which is obtained in the I/O module to the signal relay.

11. The process control method according to claim 9, further comprising:

obtaining, by an obtainer, via a transmission line connecting the first field device and the I/O module, the process value and the device management data which are autonomously transmitted from the first field device, the obtainer being disposed in the I/O module; and autonomously transmitting, by the I/O module, the process value and the device management data obtained by the obtainer to the signal relay.

12. The process control method according to claim 11, further comprising:

obtaining, by the obtainer, the data from the first field device by a command response method, in a case where the first field device does not have a function of autonomously transmitting data.

13. The process control method according to claim 9, further comprising:

autonomously transmitting, by the I/O module, the process value and the device management data which are received from the first field device to a plurality of signal relays connected to a network, the I/O module and the plurality of the signal relays being connected via the network.

14. The process control method according to claim 9, further comprising:

reading, by the controller, the process value and the device management data stored in the memory of the signal relay by a command response method.

15. The process control method according to claim 9, further comprising:

communicating, by a poller, with the first field device via a transmission line connecting the first field device and the I/O module at a constant periodic interval, the poller being disposed in the I/O module; and receiving, by the poller, the process value and the device management data from the first field device by a command response method.

16. The process control system according to claim 1, wherein the device management data indicates a self-diagnosis result of the first field device.

* * * * *